Aug. 10, 1926.
R. W. B. HART
AUXILIARY ACCELERATOR
Filed July 22, 1925
1,595,467
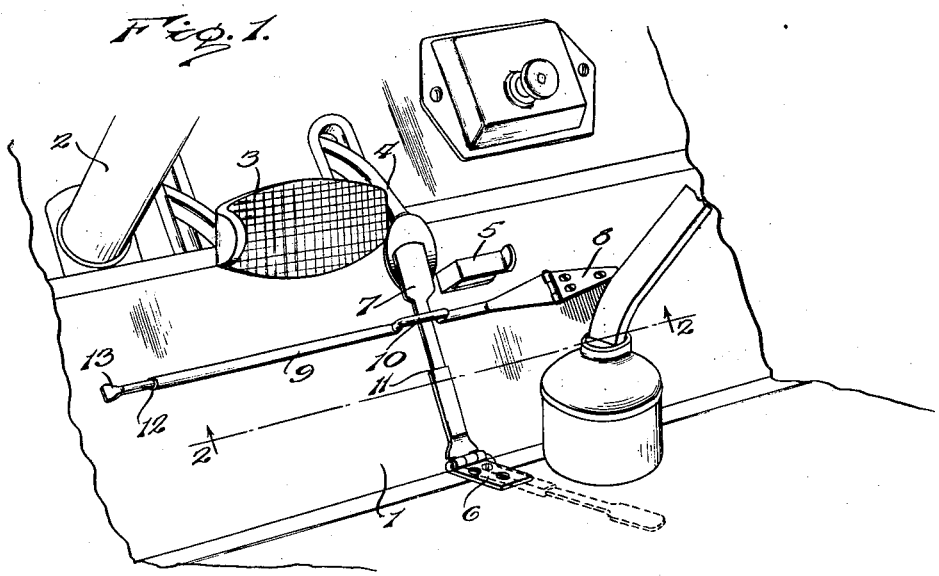
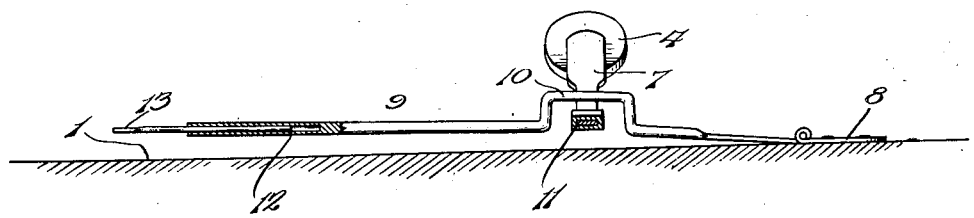
Inventor
R. W. B. Hart
By Lacey & Lacey, Attorneys Patented Aug. 10, 1926.

1,595,467

UNITED STATES PATENT OFFICE.

RICHARD W. B. HART, OF LYNCHBURG, VIRGINIA.

AUXILIARY ACCELERATOR.

Application filed July 22, 1925. Serial No. 45,352.

This invention relates to the means for controlling motor vehicles and has for its object the provision of means whereby the chauffeur may retain foot control of the vehicle at all times while obtaining rest for the right foot which is most generally used. It is common practice in the building of automobiles to provide an accelerator pedal so placed that the right foot of the chauffeur may rest thereon and exert pressure thereon to regulate the flow from the carbureter. This foot control of the vehicle is advantageous and is preferred by motorists over the hand throttle for the reason that, when the foot pedal is released the flow from the carbureter is automatically reduced, but in long trips the foot becomes fatigued and induces what is known as motorist's cramp. It is, therefore, the specific object of my invention to provide simple, inexpensive and easily applied means whereby the left foot of the chauffeur may be brought into use at times so as to retain the foot control of the vehicle while giving the right foot a much needed rest. A further object of the invention is to provide such an attachment which may be very easily moved to an inoperative position when the right foot is used so as to offer no interference to the usual manipulation of the accelerator. One embodiment of the invention is illustrated in the accompanying drawing and will be hereinafter fully described, the novel features being subsequently pointed out in the appended claims.

In the drawing:

Figure 1 is a perspective view showing my improved auxiliary accelator in position for use, and Fig. 2 is a sectional elevation, the section being taken approximately on the line 2—2 of Fig. 1.

In the drawing, the reference numeral 1 indicates the inclined foot board of an automobile, 2 indicates a portion of the steering column and 3 indicates the usual brake pedal. The usual accelerator pedal 4 is shown adjacent the brake pedal 3 as is the usual arrangement and adjacent the accelerator pedal is one form of foot rest 5 which is generally provided.

In carrying out my present invention, I secure to the foot board, at the junction of the same with the floor of the car, a bracket or plate 6 which is substantially alined with the accelerator pedal 4 and to the front end of this plate or bracket I hinge a lever 7 which, when in operative position, will have its free end projecting over and resting upon the accelerator pedal, as shown in the drawing. When the device is not in use, the lever 7 is swung rearwardly and downwardly so as to rest upon the floor or foot board out of the way in the position indicated by dotted lines in Fig. 1. I also secure upon the foot board at the right of the foot rest 5 and in a transverse plane extending between the foot rest and the plate 6, a bracket 8 which is similar to the plate 6 and to the left end of this plate or bracket I hinge an elongated foot lever 9 which is provided between its ends with an inverted U-shaped offset 10 adapted to bridge the lever 7, as clearly shown. The foot lever 9 extends an appreciable distance to the left of the lever 7 so that it may be easily reached by the left foot of the chauffeur when it is to be used. When it is not in use and the lever 7 is in the position shown in dotted lines in Fig. 1, the foot lever 9 may rest upon the foot board 1 in an obvious manner.

The bracket 8 may, of course, be placed at such point as will best suit the operator's convenience and accommodate the device to the make of car to which it is applied. In order to further adjust the device, the lever 7 is preferably telescopic in construction, the forward member or section being frictionally held in the rear member or section by a slip joint, as indicated at 11, and the lever 9 is of similar construction, as indicated at 12. The extremity of the lever 9 is preferably flattened, as indicated at 13, to minimize the chances of the foot slipping.

In its normal position, the accelerator pedal 4 stands some little distance above the foot board so that it has sufficient play to respond to the varying pressure exerted thereon by the foot in controlling the speed of the vehicle. Obviously, therefore, the accelerator lever 7 when it rests upon the accelerator pedal will project upwardly from the foot board so that it will likewise have vertical play toward and from the foot board. This upwardly extending position of the auxiliary accelerator lever 7 will, of course, support the foot lever 9 in a position above the foot board, as shown in Fig. 2, so that, if pressure be exerted upon the free end of the foot lever by the left foot of the chauffeur, downward movement will be imparted to the lever 7 and the accelerator pedal to control the flow of fuel to the engine in exactly the same manner that such flow is controlled by the usual pressure of the right foot.

It will thus be seen that I have provided an exceedingly simple and inexpensive device which may be readily applied to any automobile and by the use of which the operator will be enabled to drive the car for long periods without experiencing excessive fatigue in either foot. The auxiliary accelerator is of such form and so located that it does not interfere in any way with the usual operation of any of the standard working parts and when not in use is out of the way so that it does not inconvenience the operator in any degree. The offset 10 should be somewhat wider than the lever 7 so as to facilitate the placing of the parts in operative relation in any car, permitting a relative shifting of either part to the right or the left to a limited extent. The brackets 6 and 8 may be covered by the carpet or other floor covering in the car and the lever 7 may be so covered when it is not in use so that the attractive appearance of the interior of the car is maintained. When neither accelerator is in use, the offset 10 may be utilized as a foot rest for the right foot, and it may sometimes be desirable to form the offset as a separate piece having swiveled connection with the lever so that it may be folded down upon the foot board.

Having thus described the invention, I claim:

1. An auxiliary accelerator for motor vehicles comprising an accelerator lever adapted to rest at its free end upon the usual accelerator pedal, and means engaging and extending to the left of said accelerator lever to receive pressure from the left foot of the operator.

2. An auxiliary accelerator for motor vehicles comprising an accelerator lever constructed at one end to be hingedly mounted upon the foot board of the vehicle in alinement with the usual accelerator pedal, and an actuating member mounted upon the foot board to extend across the accelerator lever for applying pressure to said lever when influenced by the left foot of the operator.

3. An auxiliary accelerator for motor vehicles comprising an accelerator lever constructed at one end to be hinged to the foot board of the vehicle in alinement with the usual accelerator pedal and have its free end rest upon said pedal, and a presser lever hingedly mounted upon the foot board at the right of said accelerator lever and arranged to extend across said lever and have its free end disposed at the left of the same.

4. An auxiliary accelerator for motor vehicles comprising an accelerator lever constructed at one end to be hinged upon the foot board of the vehicle with its free end resting upon the usual accelerator pedal, and a foot lever hinged at one end upon the foot board at the right of the accelerator lever and having its opposite end free and disposed at the left of the accelerator lever, the said foot lever being provided between its ends with an offset spanning the accelerator lever.

5. An auxiliary accelerator for motor vehicles comprising an extensible accelerator lever constructed at one end to be hinged to the foot board of the vehicle in alinement with the usual accelerator pedal and have its free end rest upon said pedal, and an extensible presser lever hingedly mounted upon the foot board at the right of said accelerator lever and arranged to extend across said lever and have its free end disposed at the left of the same.

In testimony whereof I affix my signature.

RICHARD W. B. HART. [L. S.]